Oct. 28, 1947.   R. W. PITMAN   2,429,730
SENSING MEANS FOR BUSINESS MACHINES
Original Filed Nov. 21, 1941   10 Sheets-Sheet 1

INVENTOR
RICHARD W. PITMAN
BY K. G. Julihn
ATTORNEY

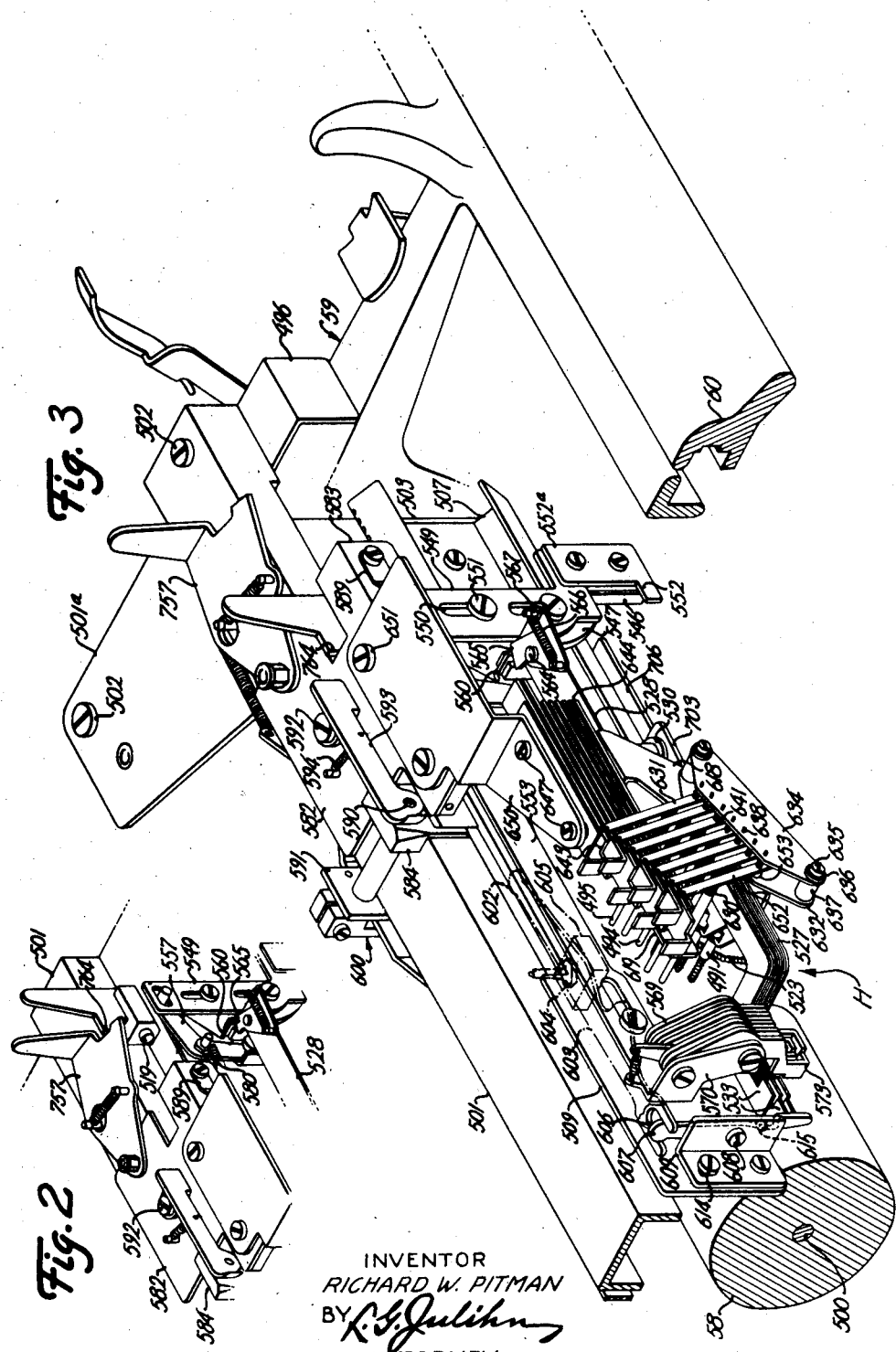

Oct. 28, 1947. R. W. PITMAN 2,429,730
SENSING MEANS FOR BUSINESS MACHINES
Original Filed Nov. 21, 1941  10 Sheets-Sheet 3
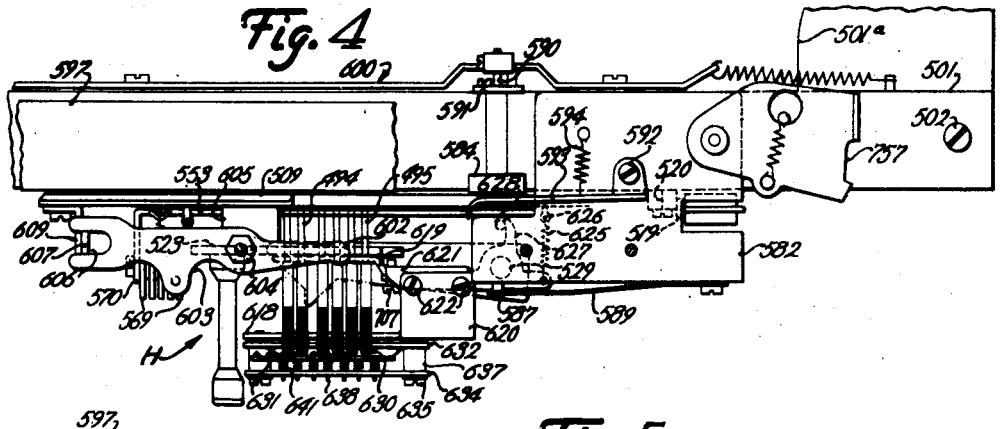
INVENTOR
RICHARD W. PITMAN
BY
ATTORNEY Oct. 28, 1947.  R. W. PITMAN  2,429,730
SENSING MEANS FOR BUSINESS MACHINES
Original Filed Nov. 21, 1941   10 Sheets-Sheet 4
Fig. 8
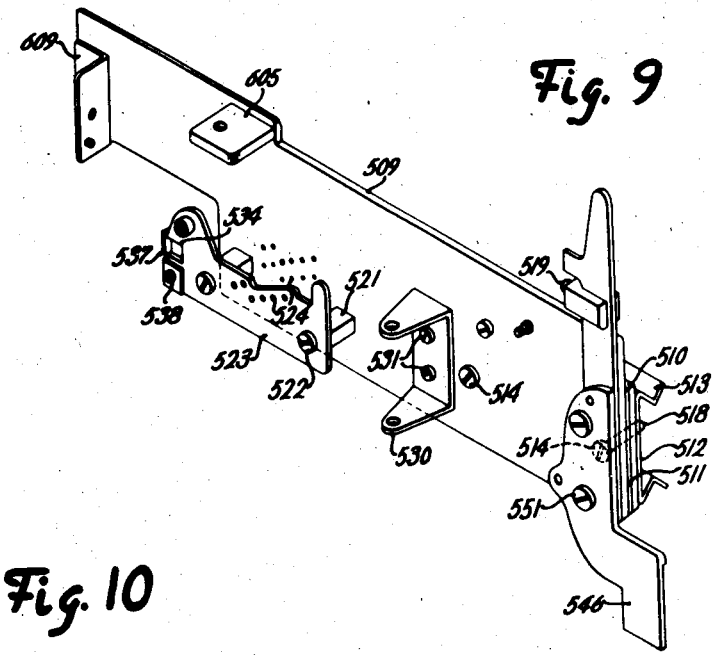
Fig. 9
Fig. 10
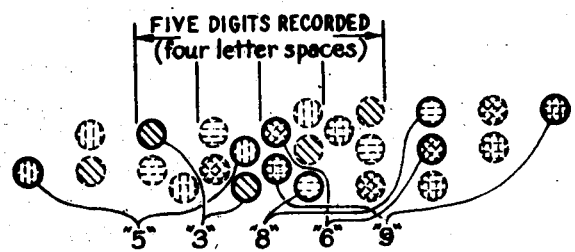
INVENTOR
RICHARD W. PITMAN
BY
ATTORNEY

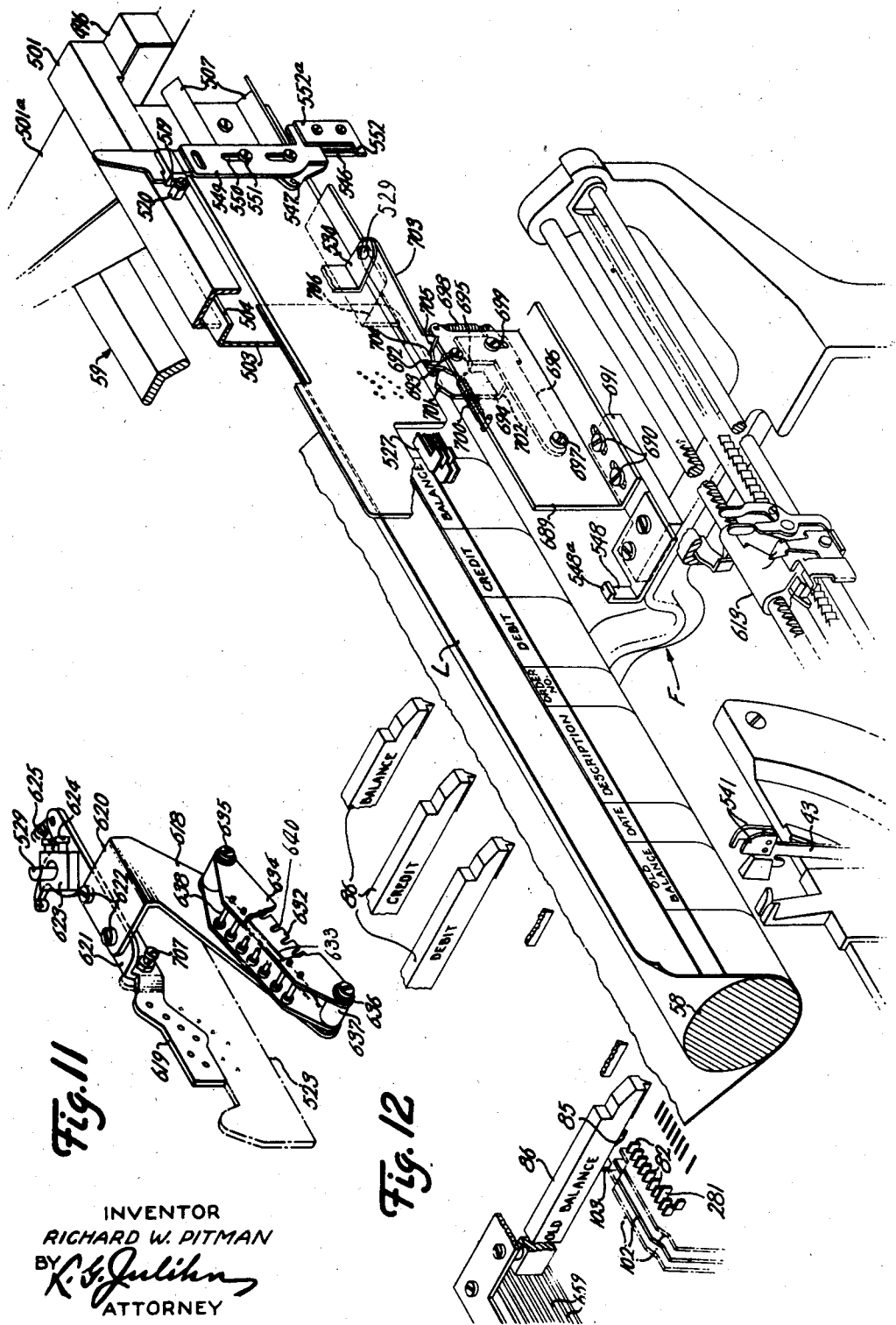

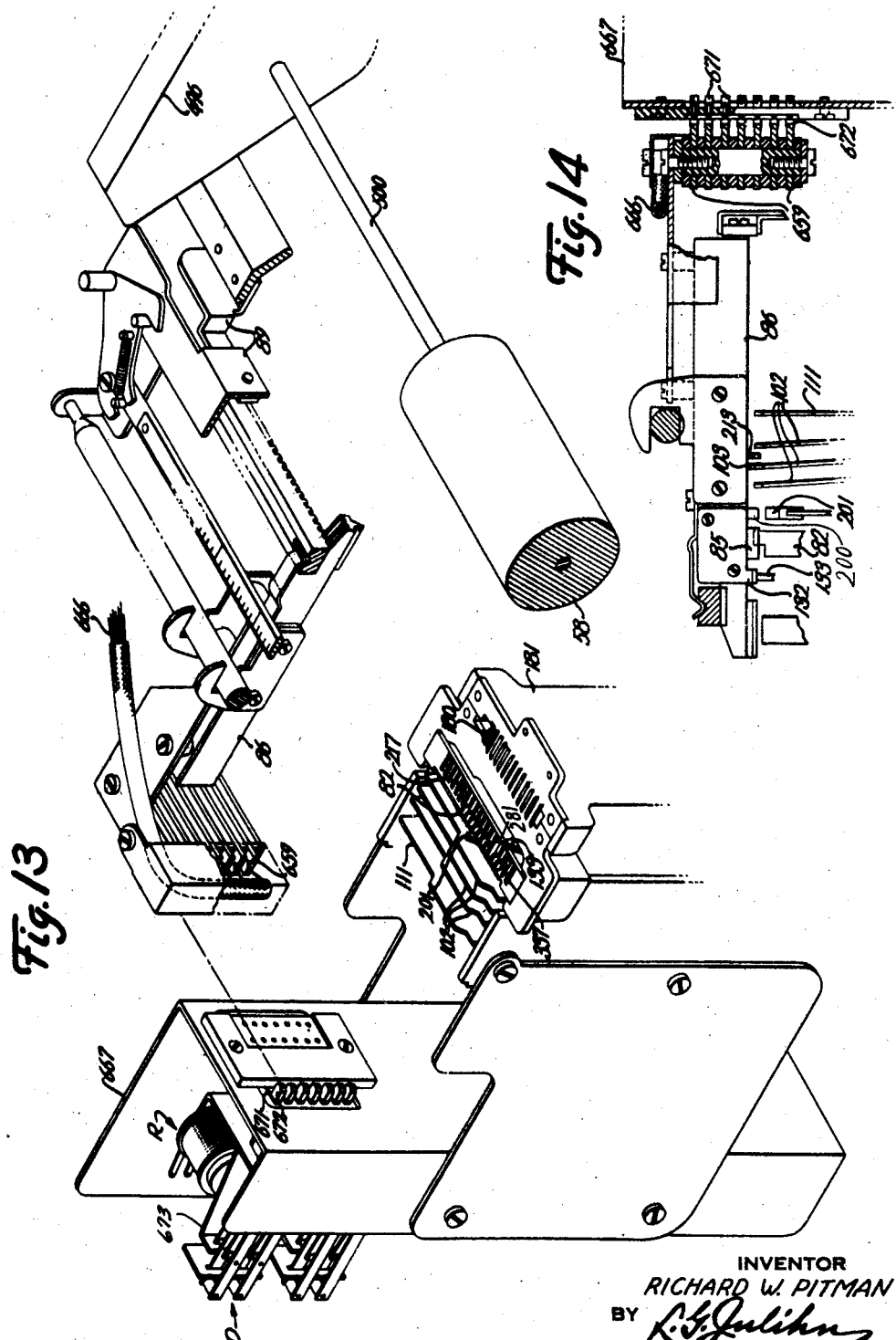

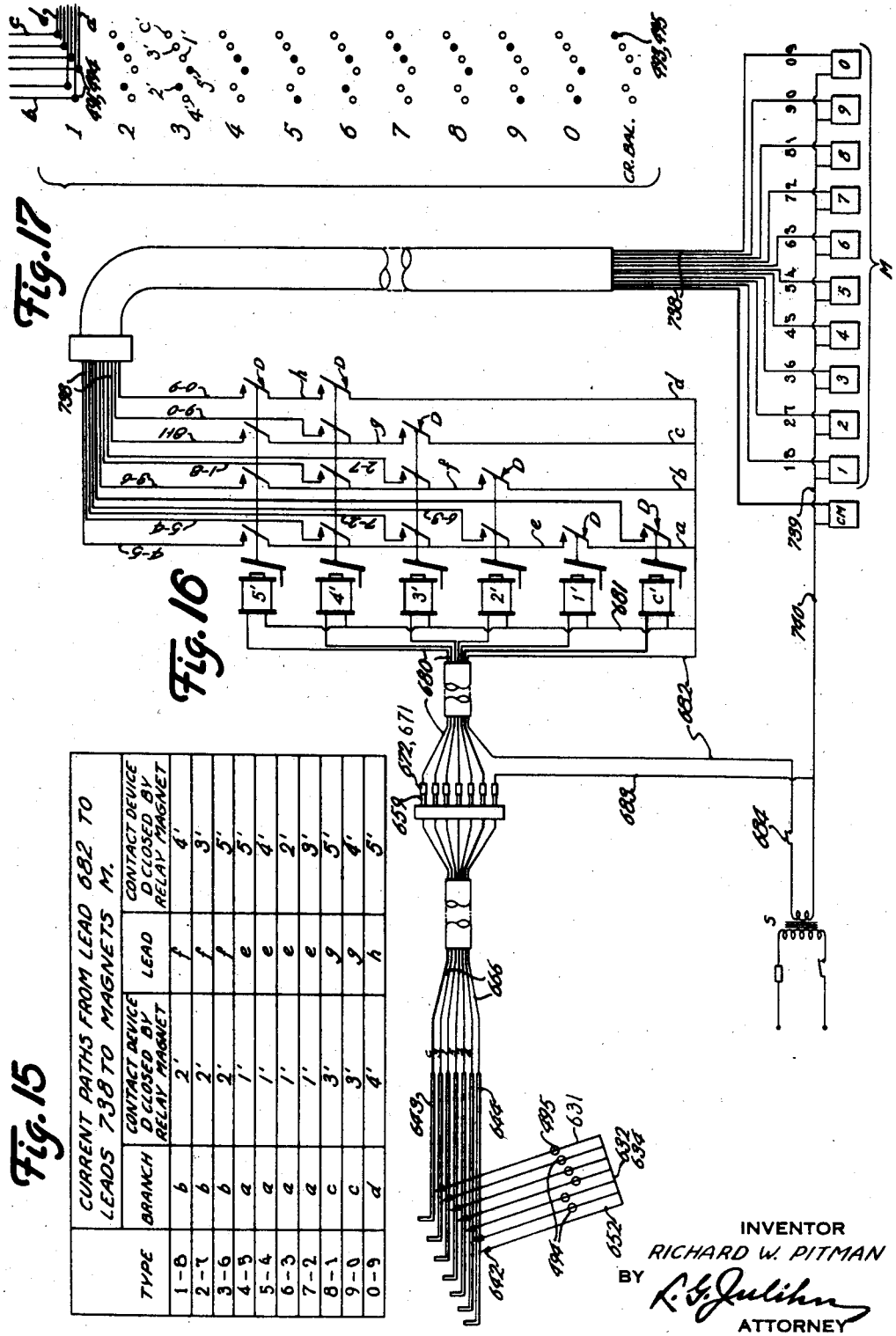

Oct. 28, 1947.  R. W. PITMAN  2,429,730
SENSING MEANS FOR BUSINESS MACHINES
Original Filed Nov. 21, 1941   10 Sheets-Sheet 8
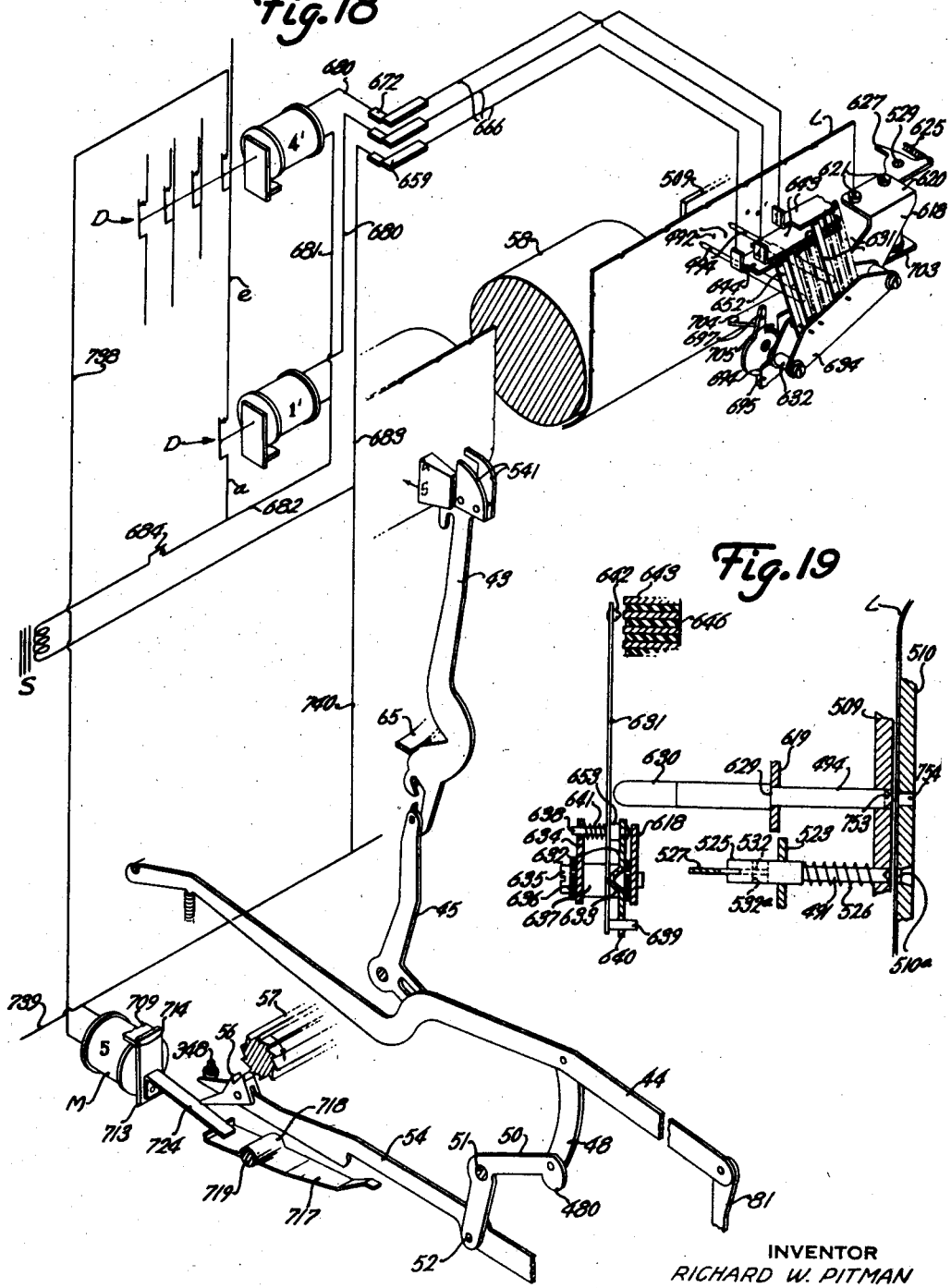
INVENTOR
RICHARD W. PITMAN
BY
ATTORNEY

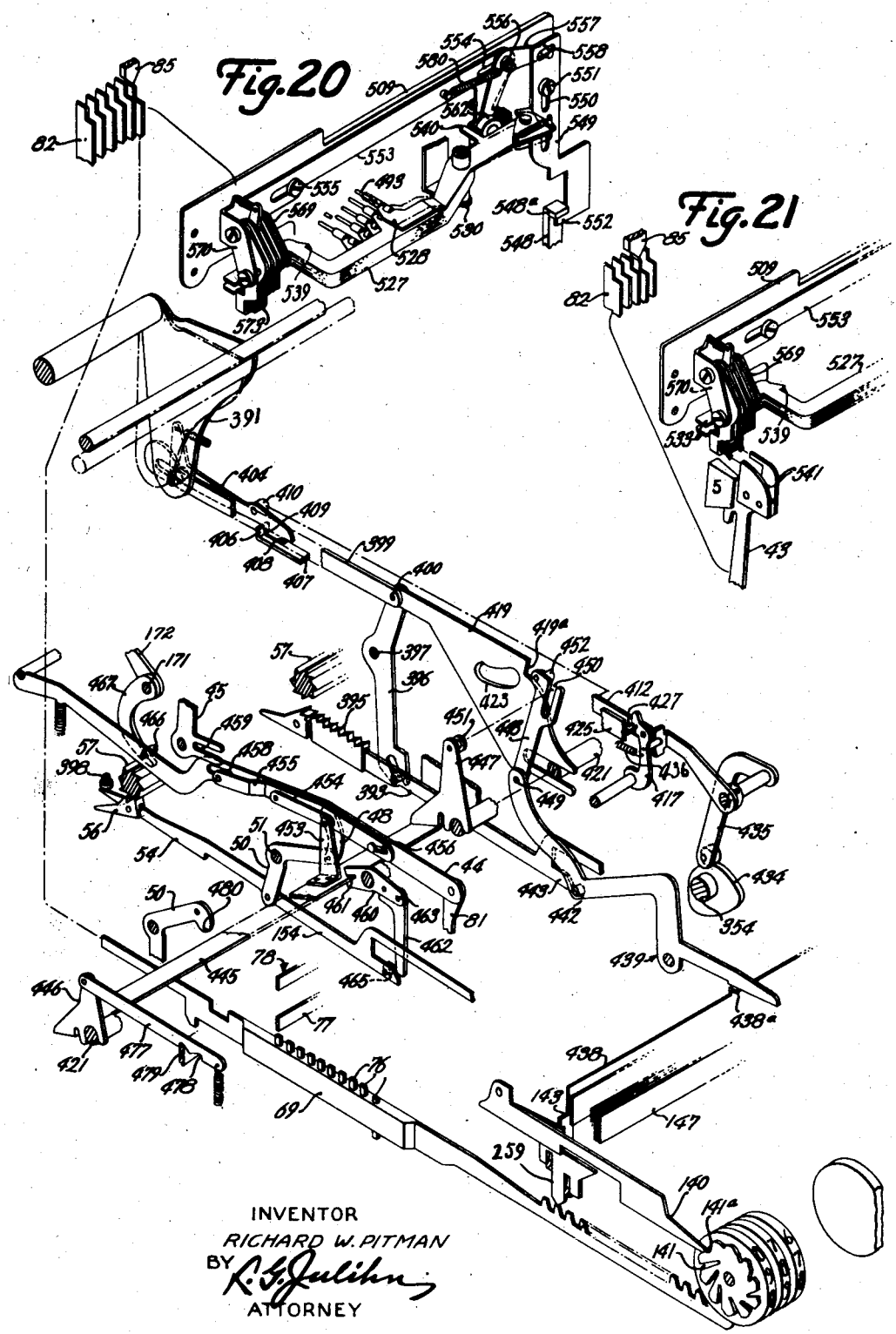

Oct. 28, 1947.　　　R. W. PITMAN　　　2,429,730
SENSING MEANS FOR BUSINESS MACHINES
Original Filed Nov. 21, 1941　　10 Sheets-Sheet 10
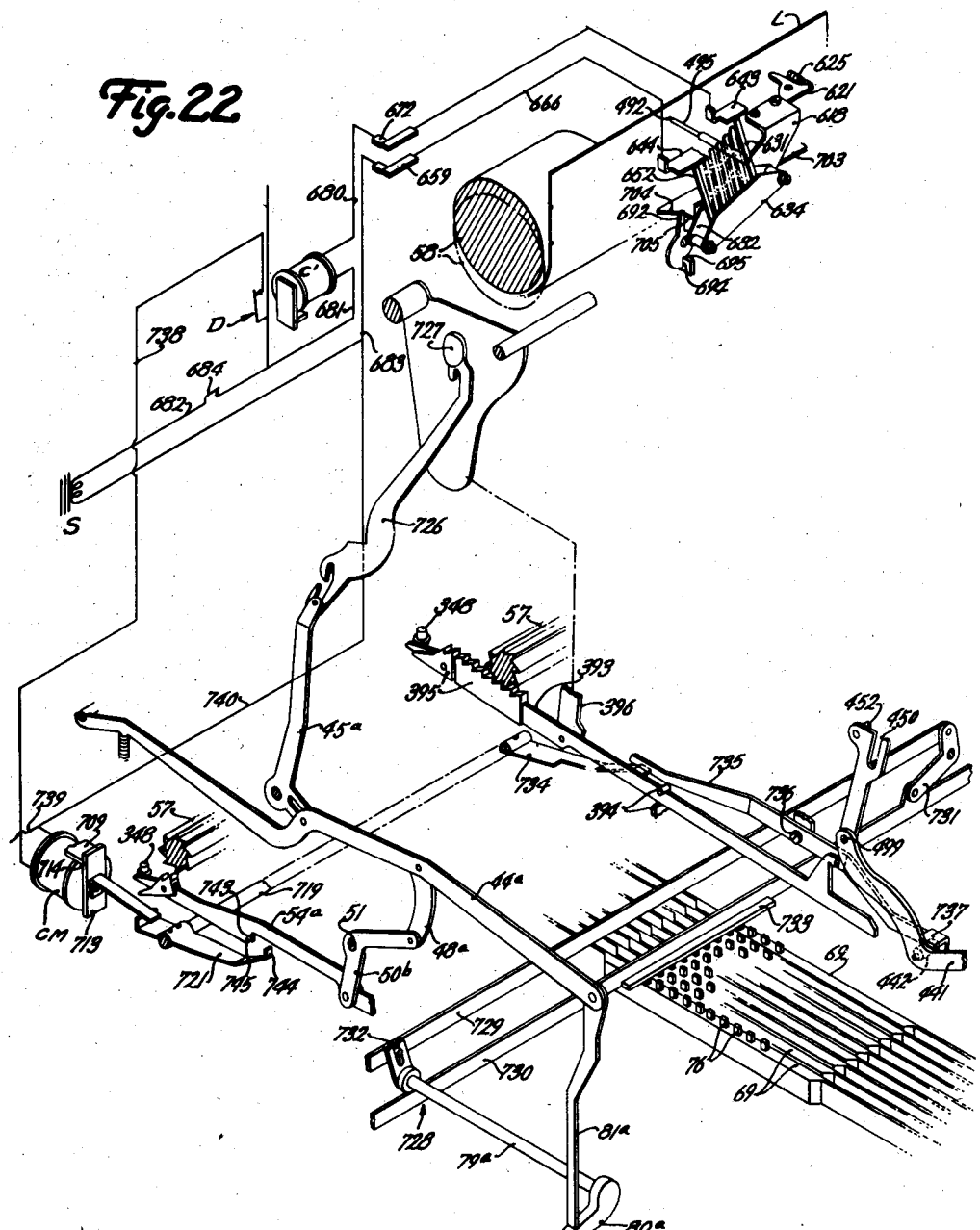
INVENTOR
RICHARD W. PITMAN
BY
ATTORNEY Patented Oct. 28, 1947

2,429,730

UNITED STATES PATENT OFFICE 2,429,730

SENSING MEANS FOR BUSINESS MACHINES

Richard W. Pitman, Laverock-Hillcrest, Pa., assignor to Underwood Corporation, a corporation of Delaware Original application November 21, 1941, Serial No. 419,889. Divided and this application February 28, 1944, Serial No. 524,199½

5 Claims. (Cl. 235—61.11)

This application is a division of my application Serial No. 419,889, filed November 21, 1941, now Patent No. 2,405,268, issued August 6, 1946.

The inventions in said application relate to business machines for computing and keeping a ledger record of progressive transactions and balances of an account.

The machine has recording means for recording a balance on a ledger sheet in a form which may be read or sensed by sensing means; it has sensing means; and it also has means cooperative with the sensing means for entering the balance in a register into which any transaction against the balance is also entered. The register therefore will contain a new balance which in turn may be recorded on the ledger sheet by said recording means and later picked up and reentered in the register in respect to further transactions.

A typewriter mechanism is preferably used in order to provide for simple selective operation of the necessary types. Another advantage of using typewriter mechanism is that in accordance with its typing one character at a time, there may be simplification of the recording-means and the sensing-means in that these may also function for one character at a time in coordination with the step-by-step feeding movements of the typing carriage.

The invention is herein shown as applied to a combined typewriting and computing machine of the Underwood-Hanson class exemplified in H. L. Pitman Patent No. 2,160,487, dated May 30, 1939, and H. L. Pitman Patent No. 2,192,365, dated March 5, 1940.

The claims of this divisional application relate to features involving the sensing mechanism. Another divisional application, Serial No. 520,983, filed February 3, 1944, contains claims on the recording and sensing features in relation to typewriter mechanism alone. Still another divisional application, Serial No. 533,220, filed April 28, 1944, contains claims relating mainly to the recording means.

My copending application Serial No. 102,389, filed September 24, 1936, now Patent No. 2,278,118, also concerns a combined typewriting and computing machine adapted for automatically picking up and reentering old balances, and the present disclosure concerns novel and important features of improvement.

Each numeral of a balance is represented by a distinctive perforation, in the ledger sheet, based on a combination scheme so that in any case the perforation will be within a small area of the sheet.

Another improvement lies in the combination scheme of perforations in that the areas of perforation for successive characters may be expanded to provide for spreading the individual perforations representing a character. This conduces to reliable operation of the sensing means.

Another improvement lies in disposing the perforations in the ledger sheet well to one side of the corresponding typing of the balances instead of having the typing and perforations interspersed vertically. One resulting advantage is that the punching and sensing means may be disposed so as not to obstruct visibility of the new balance on the ledger sheet while such new balance is being typed. Another advantage is that disposition of the punching and sensing mechanism relatively to other parts of the machine may be facilitated.

In the operation of sensing devices for reading or sensing a perforate record by making electrical contact directly through the perforations, difficulties have been encountered due in part to the punching operation of some perforations being incompleted and therefore leaving the punched-out material remaining in the sheet. Such condition may prevent actual electrical contact through the perforations, or may so limit the extent of movement of the sensing element into the perforation as to preclude satisfactory operation of the related contact switch.

Certain improvements in the present invention are directed to obviating these difficulties, by providing perforate record sensing means wherein closure of circuits to devices controlled thereby is effected at points other than directly through the perforations in the record sheet, and by providing a sensing device by which the movement imparted to the sensing element in its cooperation with the record is multiplied when translated to the point of engagement of the contact device, to the end that contact is assured for all perforations being sensed although one or more of these perforations may be incomplete.

The holes which constitute the balance-representing codal perforations may be circular and of small diameter, say, five hundredths of an inch. By reason of the preferred codal scheme, the holes may also be spaced very closely together in representing all the digits of a balance. The invention provides sensing means so arranged as to conduce to exact cooperation thereof with the ledger sheet holes under step-by-step control of the typing carriage. Parts of the hole-sensing means, and the hole punching means, are contained in a head mounted on the typing carriage. The head may move along with the typing carriage in its letter feed travel and it may also be arrested at predetermined punching and sensing zones of the carriage advance so that only the carriage and hence the ledger sheet advance step by step. This provides for step-by-step traverse of the sensing-pins and punches by the ledger sheet at said zones, and it also provides for limiting the occurrence of punching and sensing to said zones and excluding punching and sensing at other zones. Certain features of the invention relate to such sensing and punching head and for controlling same in respect to its movement or non-movement with the carriage.

The foregoing and other features, objects, and advantages of the invention will be understood from the following description and accompanying drawings of a preferred embodiment.

In said drawings:

Figure 2 is a perspective showing use of a lock-out device for the punching and sensing head.

Figure 3 is a perspective of the typing carriage and the punching and sensing mechanism.

Figures 4, 5 and 6 are respectively a top plan view, a front elevation, and a side elevation of the punching and sensing mechanism.

Figure 7 is a cross-sectional side view of a stack of contact bars of the sensing mechanism.

Figure 8 represents a ledger sheet.

Figure 9 is a front view perspective of the foundation structure of the punching and sensing head.

Figure 10 is an enlarged view of a perforate record of a certain five-denomination amount superimposed on an overall field embracing five denominations of circular areas. Selective ones of these areas are employed to designate all the digital values from "1" to "9" and "0" according to a prescribed code.

Figure 11 is a perspective of the sensing pin mounting.

Figure 12 is a perspective of the carriage and devices for stopping the punching and sensing head in punching and sensing positions.

Figure 13 is a perspective of column-unit mechanism on the carriage and mechanism traversed thereby for sensing operations.

Figure 14 is a cross-sectional side elevation of the column unit and the contact mechanism associated therewith for the sensing operations.

Figure 15 is a table of electric circuit branches of the sensing mechanism.

Figure 16 is a circuit diagram.

Figure 17 represents the code and arrangement of punches or sensing pins.

Figure 18 is a perspective illustrating the operation of sensing a positive digit.

Figure 19 is a large-scale cross-sectional side elevation of details of the punch, sensing pin and contact devices.

Figure 20 is a perspective illustrating the operations, including case shifting, in regard to punching a negative balance.

Figure 21 is a perspective illustrating the operation for punching a negative balance digit, the machine being in upper case condition.

Figure 22 is a perspective illustrating the operation for sensing the extra hole that indicates a negative balance.

Figure 23 is a diagram of the upper and lower case numeral types.

General description of machine

Figure 1:
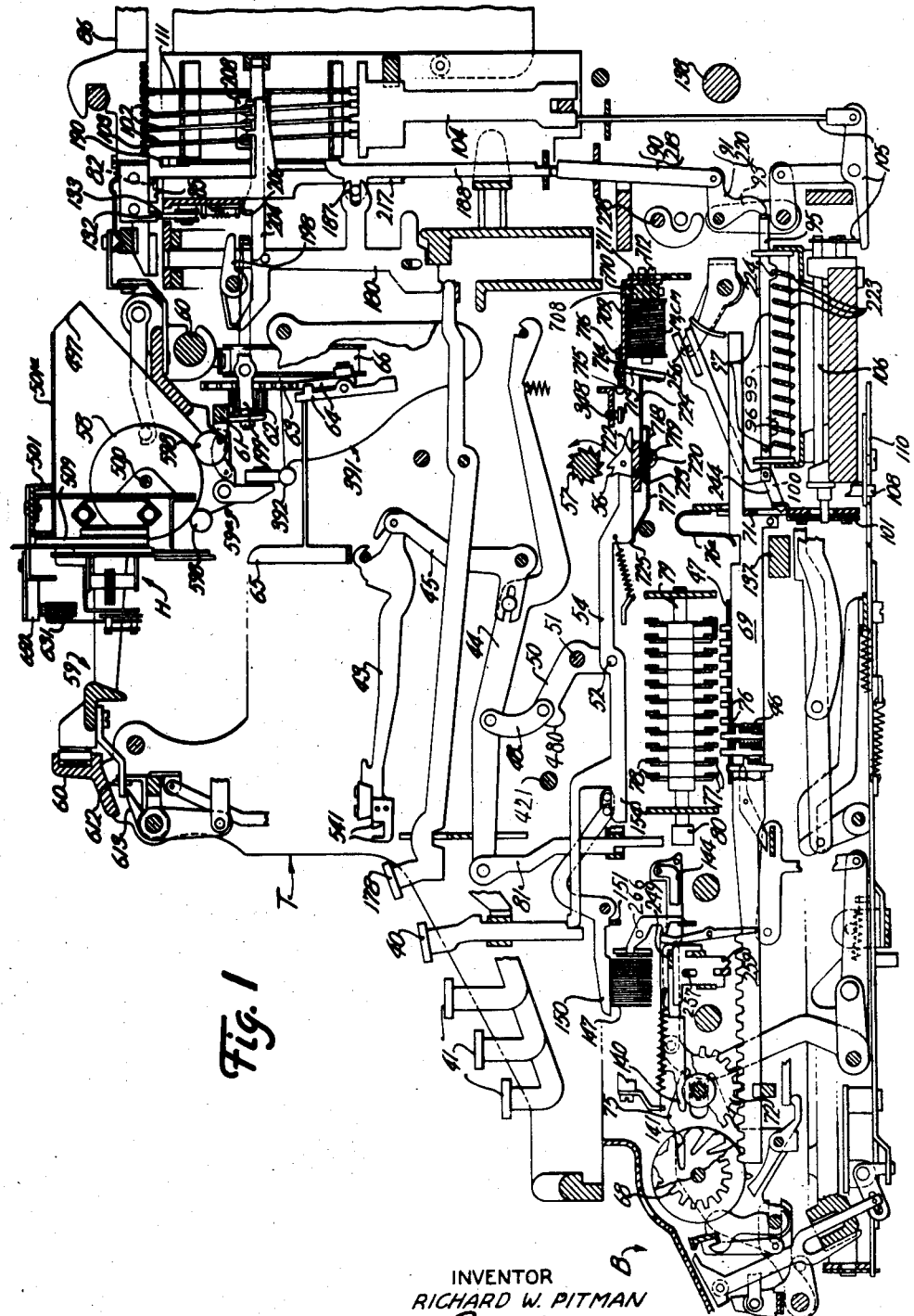
Figure 1 is a cross-sectional side elevation of a combined typewriting and computing machine embodying the invention.

Each of operating levers 50, Figure 1, for the several numeral type actions, of a typewriter T on a computing base B, has a draw link 54 to which is pivoted a dog 56. A snatch roll 57 is continuously rotatable by a motor drive, not shown. Each numeral type action includes a type bar 43 and a lever 44, connected by a bell crank 45. Links 48 connect the levers 44 to the operating levers 50 fulcrumed at 51. Depressing a numeral key 40, in a keyboard with other character keys 41, lifts the companion draw link 54 to engage its dog 56 with snatch roll 57 whereby the type action is operated to print against a platen 58. Before the type bar reaches the platen, draw link 54 encounters a knock-off 348 and becomes disengaged from the snatch roll and the type action completes the printing stroke by momentum.

Platen 58 is in a frame 59ᵃ case shiftable in a main carriage 59 guided for lateral travel. Letter-feed mechanism comprises a carriage-driving spring motor 66, a feed rack 61 and pinion 62, an escapement wheel 63 coupled to pinion 62, and a universal bar 65 operable by the type bars 43 to actuate escapement dogs 64.

There may be, say, three laterally spaced sets of computing wheels 68, forming three totalizers, and three sets of register bars or drivers 69. Pin-setting linkages 77, 78 are connected to companion rock shafts 79 on which levers 80 are actuatable by rods 81 pendent from the type action levers 44. The computing wheel drivers 69 normally stand with their index pins 76 out of the paths of the pin-setting bars 77.

A single set of denominational jacks 82, has connections 90, 91, 95, 96 to corresponding transverse blades 97 rockable about their lower edges and connected to sets of distributive racks 99 (in back of the rack shown in Figure 1) in tandem with the sets of drivers 69. Each set of racks 99 has a set of couplers 100 (in back of coupler 244) liftable by a plate 101 into position to connect the set of racks 99 to its set of drivers 69. Totalizer-selecting cam plates 102 have operating connections 104, 105, 106 to corresponding coupler lifting plates 101.

For each computing zone, the carriage has a column unit 86 having a tappet 85 for engaging the denominational jacks 82, and a totalizer selecting tappet 103 for keeping a predetermined cam plate 102 depressed while the carriage is in the zone. As the carriage moves through the zone at operation of the numeral type actions, the jacks 82 are depressed seriatim by tappet 85 and thereby the computing wheel drivers 69 of any set that has been operatively connected to the jacks 82 by depression of the corresponding cam plate 102 are displaced endwise seriatim to bring their pins 76 under the pin-setting bars 77 so that the numeral type action operations index the amount.

A reciprocatable general operator cross bar 137 advances the drivers 69 to extents corresponding to the depressed digit pins 76. Returning, the bar 137 returns drivers 69 to their normal positions. A spring device 76ᵃ returns the driver slightly beyond bar 137 to permit the drivers to be advanced slightly to pin-setting position, and also retracts the slightly advanced driver 69 when carriage tappet 85 leaves the corresponding jack 82.

Each column unit 86 may have a cycling tooth 132 to engage cycle trip lever 133 to initiate a cycle of the general operator mechanism. The cycle initiating means and other details of the general operator mechanism are more fully shown in Patent No. 2,160,487. In the cycle a general operator cross bar 137 is reciprocated forward and then back by means including a cycling shaft 138 and thereby reciprocates those register bars 69 in which any digit pins from "1" to "9" have been set.

Each set of computing wheels 68 is in a frame 75 rockable by the general operator mechanism so that the wheels are shifted into and out of connection with their drivers during the cycle. Frame 75 is shiftable for connecting the wheels 68 either directly with the drivers 69 for addition or with driver idlers 72 for subtraction. Carriage-operation of the corresponding cam plate 102 and a connection, not shown, lifts a latch 108 from a state control bar 110 for consequent spring-urged forward shift of the latter to an add position against a secondary latch, not shown. Retraction of the secondary latch as by a subtraction cam plate 111 operable by column unit 86 results in further forward shift of bar 110 to a subtract position. The add and subtract positions of bar 110 determine, by means of mechanism not shown, connection of the wheels 68 to the drivers directly or to the idlers.

Carryover mechanism, partly shown, is controlled by the computing wheels 68 to determine extra steps of carryover advance of the computing wheel drivers 69. Fugitive-one mechanism is provided, to cause an extra step of the lowest-order wheel subtractively at rotation of the highest-order wheel to the "9" position. These mechanisms may be as set forth in H. L. Pitman Patent No. 2,192,365.

*Making the first line entry on the work sheet*

After inserting the ledger sheet in the machine, as later explained, the first entry 5690 14 is typed in the old balance column, for which there will be a column unit 86 on the carriage, so that the entry is also indexed in the drivers 69 for the set of computing wheels which the unit 86 selects by depressing a predetermined one of the cam plates 102. The general operator is then cycled to run the indexed entry into the totalizer. After typing entries in the descriptive columns, the debit column entry 123 62 is typed and is concomitantly indexed in the drivers 69 for the same totalizer that received the old balance 5690 14. The general operator is then cycled to add the debit entry in said totalizer which then registers a new positive balance 5813 76. Then the carriage is advanced to the balance column of the ledger sheet.

Preferably, the new balance is printed automatically in the balance column. Operation of a total key 178, Figure 1, lifts a reed 180 to rock levers 198 and 199 to lift carriage rack 61 from pinion 62 for resulting advance of the carriage to a tooth 201, Figure 14, of a counterstop 190 which, by a connection 187, is lifted by reed 180 to engage a stop 200, Figure 14, on column unit 86. Lifted reed 180 displaces a rod 204 to tilt the cam plates 102 rearwardly to connect them with corresponding jacks 217. The operation and release of total key 178 brings the carriage to a position a letter space higher than the highest order of the balance column which has a capacity of, say, eight places for amounts up to 999 999 99. At said position, a tappet 213, Figure 14, depresses the tilted cam plate 102 for the totalizer from which the total is to be printed and thereby depresses the corresponding jack 217 which, through connections 218, 220, 223, 224 and shaft 228, causes release of a corresponding set of total readers 140 to engage digit stops 141 on computing wheels 68. The total readers 140 thus assume positions representing selection of operating levers 150 for the type action draw links 54 which are to be operated for printing the total. Shaft 228 is rocked clockwise to release means, not shown, which normally keep a feeler-restoring bar 249, together with all the feelers 140, retracted. Each reader 140 has a finger partly shown at 144 which becomes positioned under such one of blades 147 as corresponds to the reader position. Each blade is operatively connected to a corresponding lever 150. The depression of jack 104 also results in operative connection, by means including interponent plates 259, of the drivers 69 to said fingers 144 so that the latter will be lifted seriatim, to lift blades 147 to operate levers 150 to connect the corresponding numeral type actions in proper order to the snatch roll, by the seriatim advance by the carriage of the drivers to pin-setting positions.

The totalizer has nine wheels of which the highest is used in detecting an overdraft; the other eight wheels correspond to the eight places of the balance column. The position at which the carriage becomes placed by operation of total key 178 corresponds to this highest wheel. In accordance with this highest and succeeding wheels registering insignificant zeros, for a positive total, a carriage spacing mechanism, later referred to, is automatically operated to advance the carriage step-by-step, without printing, to the first significant figure position at which the selected numeral type action is automatically connected to snatch roll 57 and operated. The typing of the other significant figures then progresses automatically and there is also automatic passage of the carriage over the punctuation space between dollars and cents.

A case-shift draw link 393, Figures 20, 22, is liftable about a fulcrum 394 to engage its rack teeth 395 with snatch roll 57. A lever 396 fulcrumed at 397 has a pin-and-slot connection to said draw link and has a pivotal connection 400 to a link 399. Link 399 has a slot for lost-motion connection to a stud on shift rail frame 391.

When draw link 393 is lifted and becomes actuated by snatch roll 57, lever 396 is caused to rock clockwise, Figure 20, and move link 399 and a plate 419 pivoted at 400 to lever 396. The initial portion of the rightward movement of plate 419 depresses a lever 425, partly shown, by means of cam edge 423 to bring its stud 427 under a latch shoulder of an arm 417 and at the same time, shift said arm 417 clockwise to shift, a link 412, partly shown, forwardly. A cam stud on the portion of link 412 not shown engages a stud 410 to lift a latch arm 404, on shift rail frame 391, from a catch 406, on a plate 407, preparatory to case-shift movement of said frame 391, by further movement of link 399, lever 396 and draw-link 393 under the drive of the snatch roll 57. When the case-shift movement of shift-rail-frame 391 is completed, lever 425 remains depressed in that it is caught by arm 417. Therefore, said arm 417 remains displaced together with link 412, so that latch arm 404 may engage its shoulder 409 with catch 406 to sustain the case shift as in Figure 20.

A cam 434, fixed to shaft 354 of the general operator mechanism may actuate a follower lever 435 to move and thereby release arm 417 from lever 425, the latter thereby becoming restored by a spring, not shown. The restoration of lever 425 permits arm 417 and link 412 to be restored by a spring 436. By said restoration, a means, not shown, rocks the case-shifted latch arm 404 upwardly to release its shoulder 409 from catch 406 thereby permitting the shift-rail-frame 391 and platen frame 59ª to become restored to lowercase position by gravity in which shoulder 408 of latch arm 404 drops behind catch 406.

Negative total or credit balance printing

When the highest order wheel of the register stands at "9" it presents a slot or stop 141ª, Figure 20. When the set of feelers 140 becomes released the stop 141ª positions the highest order feeler 140 so that its selector tab 143 is under a blade 438. The carriage having become positioned, through operation of the total key 178, at the place corresponding to the highest order wheel, the corresponding register bar 69 will have become slightly advanced to lift said blade 438, by means of said tab 143 and corresponding interponent plate 259.

The lifting of blade 438 operates through a lever 439 to depress arm 443 to rock case shift draw-link 393 into engagement with snatch roll 57. The resulting case shift is sustained by latch arm 404, and determines use of the upper-case numeral types, each numeral type bar 43 having a lower-case numeral type 444 and an upper-case type 444ª which is the nines complement of the lower-case type as in Figure 23.

A cross bar 445 has upstanding end arms 446, 447 attached to a cross rod 421, Figure 20. A coupler-rod 448 is pivoted at 449 to an arm of lever 439 and has a slot 450, slidably fitting a headed stud 451 of cross bar arm 447. When lever 439 is moved by lift of blade 438 to connect case-shaft draw-link 393 to snatch roll 57, rod 448 is lowered to interpose its stud 452 opposite an edge 419ª of plate 419. This enables plate 419 in its case-shift-attending forward movement to move arm 447 and thereby shift cross bar 445 upwardly about the axis of rod 421.

An upstanding arm 453 on cross bar 445 has a link 454 to a coupler-bar 455 slidably supported at 456 on lever 44 of the "9-0" type action. Coupler bar stud 458 normally engages in slot 459 of bell-crank 45 of said "9-0" type action. By the upward shift of cross bar 445, coupler bar 455, is shifted forwardly to withdraw stud 458 from slot 459 thereby disconnecting bell-crank 45 and, therefore, the "9-0" type bar 43 from the companion operating lever 44.

An arm 460 on rod 421 is connected to cross bar 445 at 461. A thrust-rod 462 has a pivot 463 on arm 460 and may stop against arm 460. In the normal position of the "9-0" draw link 54, a stud 465 on its arm 154 underlies the lower end of thrust-rod 462. Therefore, when cross bar 445 is lifted at the case-shift operation as effected under control of the highest computing-wheel standing at "9" preparatory to credit-balance total printing, it will not only disconnect the "9-0" type bar 43 from the companion lever 44 but will also depress thrust rod 462 to depress arm 154 of the "9-0" draw link 54 to connect the latter to snatch roll 57. It results that said lever 44 is power-operated without printing. This operation of "9-0" lever 44 actuates, through rod 81, a corresponding pin-setting linkage 78 to set the "9" digit pin 76 in the highest order register bar 69.

A stud 466, Figure 20, in said "9-0" lever 44 engages a cam-arm 467 on rock shaft 171 whose arm 172 has an operative connection, not shown, to the escapement rocker, Figure 1, carrying escapement dogs 64, to effect letter feed of the carriage. It will be seen now that at the operation and return of said "9-0" lever 44, without printing, as a result of the highest wheel standing at "9" and the carriage being at the place corresponding to said highest wheel, the carriage becomes letter-spaced to the place corresponding to the wheel of next lower denomination. If said next lower wheel stands also at "9," the corresponding feeler 140 will be positioned by the "9" representing slot 141 of said latter wheel and, therefore, the "9" blade 147 will be lifted to connect the "9-0" draw link 54 to snatch roll 57 for a resulting reoperation of "9-0" type action lever 44 at which a "9" pin will be set in the register bar 69 corresponding to said next lower denomination. Thus, the "9-0" type action lever 44 is reoperated, without printing, for every computing wheel, after the highest wheel, that stands at "9" and therefore, represents an insignificant figure ahead of the first significant figure of the negative total.

The cross bar 445 is maintained in its normal and upwardly shifted positions by a detent device comprising parts 477, 478, 479, Figure 20.

At the first operation of "9-0" lever the companion lever 50 shifts a device, not shown, to connect operatively the "0-9" type action, instead of the spacer action to the "0" blade 147.

When the carriage reaches the place corresponding to the computing wheel representing the first significant figure (any figure from "0" to "8") of the negative-total, the corresponding type-action will be selected and operated. By such operation of a first significant figure type-action, a nose 480, Figure 1, of the corresponding lever 50 engages and depresses the lifted cross bar 445 to normal position gaged by detent 477, 478. By such restoration of cross bar 445, the coupler bar 455 becomes shifted, thereby reconnecting the "9-0" type bar 43 to its lever 44, to enable it to print any upper case "0" that may occur after the first significant figure of the true negative-total.

The printing of the true negative-total now proceeds digit-by-digit, the significant-figure type-actions being selected and operated under control of the computing wheels and carriage in the same manner as described with reference to positive total-printing, it being noted that the case-shift mechanism remains operated so that the printing is done by means of the upper-case-types 444ª.

In the letter-feed step of the carriage which attends the printing of the last digit of the negative-total, the column unit 86 initiates a cycle of the general operator mechanism in the computing base. Although the true negative total is printed, the nines complement thereof is set up in the index pins 76 of the register bars and includes the setting of the insignificant "9's" in these register bars corresponding to the computing wheels standing at insignificant "9" position. Therefore, during said cycle, the significant figure computing wheels, from which the negative-total was printed, and the wheel or wheels standing at insignificant "9" are rotated subtractively to zero or clear positions. During said cycle, the cam 434 and follower-lever 435, Figure 20, cooperate to displace arm 417 for resulting release of the case-shift latch arm 404 from catch 406 and consequent restoration of the platen to lower-case position.

For computing and recording a latest or new balance, the ledger sheet L, Figures 8, 12, is first inserted in the machine. Then the machine is operated according to an initial amount or the last previous balance to enter the same into a clear register, which in the present instance, is the middle or No. 2 register. Thereafter, the machine will be operated for entering the debit or credit in the No. 2 register. The No. 2 register will now contain the new balance, which may be either positive or negative. The machine is then operated, according to this new balance in the No. 2 register, to record this new balance in the Balance column while the carriage traverses the corresponding zone.

The new balance taken from the register is recorded on the ledger sheet in the form of codal representations, preferably perforations 490, made in the ledger sheet by operating for each digit two of five punches 491 arrayed as in Figures 3, 5, 17. In Figure 17, representing the punching and sensing code, the particular two punches 491 and sensing pins, for each digit "0" to "9", are indicated by the shaded punches.

The five punches 491 are spaced horizontally and vertically on the center lines a and b in the staggered array seen in Figure 17. The horizontal spacing of lines b is such that the second and third lines from the left are one and one-half letter spaces or .15 of an inch apart, or a three-times multiple of half a letter space. The horizontal spacing of the other lines b may be one-tenth of an inch which measures a letter space in the present machine. The greater spacing between the second and third lines b divides the complement or group of punches virtually into two sub-groups. The vertical spacing of lines a is such that two perforations that are closest to one another in an amount-representing line of perforations will not overlap but will be distinctly separated. In the present instance the vertical spacing is .0325 of an inch and the hole-diameter is .05 of an inch. In that the punches are spaced vertically, they are, in effect, lying in different planes parallel to the direction of letter feed. It will be observed that the punches in the respective sub-groups are staggered, that is, the punches in the left sub-group are on alternate horizontal lines with respect to the punches in the right-hand group, thus affording the closeness of perforations in an amount-representing line, without overlapping. By this scheme of arraying the punches in echelon, the punches are amply spread to the extent of four-and-one-half letter spaces and any two holes representing any digit will be spaced horizontally sufficiently from any two holes representing the next adjacent digit on the work sheet, even though the respective four-and-a-half letter-space fields overlap and the representations of the several digits are interspersed. Figure 10 shows the overlapping and interspersing of the respective groups of perforations representing five digits of consecutive denominational orders of an arbitrary amount "53869". The two perforations codally representing each of these digits are identified in the view by the respective numeral values. These perforations are superimposed on an over-all field of circular areas or spots representing an aggregate of all perforations which may be employed to represent all the digital values from "1" to "9" and "0" according to the code of Figure 17. The areas used for the credit-balance perforations, later described, are omitted from the showing, for simplicity. The circular areas that are not actually perforated for the amount "53869" are shown in dotted outline, where as the perforations that are made to record this amount are shown in full outline. The five circular areas comprising each denominational group, including those actually perforated, are uniformly "colored" by crosshatching to distinguish each group from the others of the five groups.

Only the significant figures of the new balance are represented by perforations 490. A line of perforations 490, Figure 8, representing a negative new balance represents the nines complement of the true overdraft and is distinguished as such by punching an extra or credit-balance hole 492 by means of an extra or credit-balance punch 493. Said extra punch is grouped with the complement of five punches 491 by being disposed on the horizontal and vertical center lines c, d, Figure 17.

Five sensing pins 494 corresponding to the five punches 491 and an extra or credit-balance pin 495, Figure 17, are arranged substantially the same as are the punches of the group just described. That is, the sensing pins are in a group divided into two sub-groups, and the pins lie in different planes parallel to the direction of letter feed and may be staggered in the respective sub-groups. The group of sensing pins is, however, disposed one-third of an inch, two single-line-space units, above the punch group, Figure 5.

The line of perforations is disposed, Figure 8, on the ledger sheet to the right of and above the new balance as typed in the Balance column. This disposes the perforations in an individual column to the right of the new-balance typing column of the work sheet as distinguished from having the lines of balance-perforations and balance-typing interspersed vertically in one column. The new balance typing zone is, of course, within the length of the platen 58 but the portion of the work sheet that includes the companion perforations may extend beyond the right hand end of the platen. Therefore a right hand side member 496 Figures 3, 12 of the platen frame 59ᵃ is spaced more than is usual beyond the right hand end of the platen 58. Said side member 496, a left hand side member 497 and an intermediate plate 498, journal an axle 500 to which the platen 58 is fixed.

The punches 491, 493 and sensing pins 494, 495 are contained in a head or sub-carriage H, Figures 1, 3-6, that is mounted on and is case-shiftable with the platen frame 59ᵃ.

*Punching and sensing head structure*

A cross bar 501 and right and left end-baseplates 501ᵃ fixed thereto are secured by screws 502 to platen frame side-members 496, 497, Figures 3, 4, 5, 6 and 12. A depending plate 503 has the aforementioned ear 499 and has a flange 504 secured by screws 505 to cross bar 501. A plate 506 including V-shaped outer trackways 507 is secured to plate 503 by screws 508.

A die plate 510, 510ᵃ, Figure 19, for punches 491, 492 is spaced from and behind a foundation plate 509 by spacer plate 511, Figure 9. A plate 512 including V-shaped trackways 513 is secured, together with die plate 510 and spacer plate 511, to the back of foundation plate 509 by screws 514. Rollers 515, Figure 6, are disposed between the trackways 507, 513 and hence the punching and sensing head comprising the foundation plate 509 and its attachments is movable laterally relatively to the platen frame 59ª. A spring 516, connected between a stud 517 of plate 506 and a stud 518 on screw 514 urges the punching and sensing head leftwardly relatively to said platen frame as viewed from the front of the machine. A stop 519 on said head engages a stop 520 on the platen frame to limit the leftward movement of said head relatively to said platen frame. Spaced forwardly from the foundation plate 509 by bosses 521, Figure 9, and secured to said bosses by screws 522 there is a guide plate 523 for the forward ends of the punches 491, 493, said guide plate and foundation plate having punch-guiding holes 524 in which the punches are slidable. The punches are normally retracted within the foundation plate 509 so that the ledger sheet may be freely inserted within the gap formed between the die plate 510 and the foundation plate.

A helical spring 526, on each punching stem, reacts against the foundation plate 509 and the shoulder of an enlarged punch portion 525 for retracting the punch from the paper and into the foundation plate.

Five punch operating levers 527, for the five punches 491, and a lever 528, for the credit-balance punch 493, are individually operable about a common vertical fulcrum shaft 529 turnable independently in ears 530 of a bracket fixed to foundation plate 509 by screws 531. Each punch is articulated to a companion lever 527, or 528. Lever-separating spacers 529ª, Figure 5, and outer spacers 529ᵇ cooperate with bracket ears 530 to locate the punch levers vertically along the fulcrum shaft 529. The five levers 527 extend horizontally leftwardly from the fulcrum shaft 529 to present an array of forwardly extending tongues 533, Figures 3, 5, one on each lever.

The two outer levers 527 bear respectively against upper and lower edges of a notch 534 of plate 523, Figure 9, and a spacing shim, not shown, is placed between each two adjacent levers 527, to support and space the levers vertically near tongues 533. The spacing shims are retained by plate 523 and by a clip 537 secured by a screw 538 to plate 523. Each lever 527 has a shoulder 539, Figure 20, to stop against plate 523 under the influence of the punch retracting spring 526. The extra punch lever 528 has a stop 540 against foundation plate 509.

Tongue-striker plates, such as 541, Figures 1, 21 are secured to the type bars to selectively operate the punch levers 527 at the printing strokes of the type bars.

*Punching operation when a new balance is positive*

Consider that the total key 178 has been operated and that therefore the carriage has been tabulated leftwardly into the Balance column and is at the position corresponding to the highest computing wheel in said register. The punching and sensing head H with its stop 519 bearing against the carriage stop 520, Figure 5, and coupled to the carriage by spring 516, Figure 8, has traveled leftwardly in unison with the travel of the carriage to said highest denomination position wherein the array of tongues 533 of the punching levers 527 has been brought into the striking field of the tongue strikers 541 of the numeral type bars 43.

By reaching the highest denomination of a total printing field, through operation of the total key 178, the total-printing mechanism will have been brought into play so that if the total is positive and the highest denomination computing wheel registers a significant figure a corresponding numeral type action will be actuated automatically to print said significant figure. But if the highest denomination wheel stands at insignificant "0" the carriage spacing mechanism will be operated automatically to step the carriage to the next denomination.

At the instant that the punching and sensing head reaches the highest denomination position for the Balance column along with the carriage, a stop edge 546, Figure 12, of a stop plate 547 attached to the punching and sensing head H encounters the right hand side of a fixed stop 548 on the framework of the machine. Head H is arrested by means of stops 546, 548 and thereby the punch lever tongues 533 are kept in the striking field of the type-bar strikers 541, 542 while the carriage proceeds, along with the ledger sheet L, through all denominations of the Balance zone. If the carriage merely spaces automatically through higher denominations, because of insignificant zeros in the corresponding computing wheels, no type-bars are operated and therefore no punching is effected for the insignificant figures. When the carriage reaches the position corresponding to the first significant figure of the balance, the corresponding type-bar 43 is automatically operated and operates corresponding punch levers 527 to punch the ledger sheet with the two holes representing the first significant figure. The attendant letter-feed step of the carriage brings the carriage to the next position for which a type-bar may be operated automatically and will operate corresponding punch levers 527 to punch the sheet with two holes representing the second significant figure. In this way codal representations of the significant figures registered in the computing wheels are punched one-by-one automatically to sensably record the balance in the perforation column on the ledger sheet. The type-bars may also, as in the present instance, concomitantly type the balance in the Balance column of the sheet.

*Punching operation when a balance is negative*

Consider again that the carriage has been tabulated to the position, in the Balance zone, corresponding to the highest computing wheel of the No. 2 register, by operation of the total key 178. Consider further that said highest wheel stands at "9" indicating that the registered balance is not positive but is the nines complement of the true negative balance. In that case, by means of feeler 140 and blade 438, operation of the case shift mechanism is determined so that although the type bars 43 will be selected and operated according to the registered nines complement, nevertheless the true negative balance will be printed by means of the upper case types 44ᵃ. In order to make manifest on the ledger sheet itself that a line of perforations 499 represents a negative balance and, moreover, represents the nines complement of such negative balance, the extra punch 493 is operated to punch the extra hole 492, Figure 8. The case shift operation, which results from the highest wheel standing at "9," may be used as the medium to effect the operation of the extra punch 493.

A rod 549, Figures 3, 5, 6, 12, has slots 550 slidably fitting headed studs 551 on plate 547 and presents a shoulder 552 under and vertically opposed by a lug 548ª on stop 548 as at Figure 20 when the carriage is positioned in the Balance zone at the highest denomination place. As shown in Figures 3, 5 and 12, shoulder 552 may be on a plate 552a vertically adjustable on rod 549. A horizontal bar 553 has slots 554 slidably fitting studs 555, 556 on foundation plate 509. A bell crank 557 fulcrumed on stud 556 has a pin-and-slot connection 558 to rod 549 and presents laterally spaced ears 559, 560. A block 561 on ear 560 has a roller 562 bearing against foundation plate 509. Bell crank 557 presents a roller 563 between ear 559 and block 561. Extra punch lever 528 has a pivot-stud 564 for a by-pass cam 565 urged counterclockwise by a spring 566, said cam normally stopping against a stud 567 on lever 528.

When the carriage is at the highest place in the Balance zone and the case-shift operation occurs because the highest wheel registers "9," the rod 549, being opposed by fixed stop lug 548a, does not partake of the case-shift movement of the foundation plate 509 and its attachments which include bar 553 and bell crank 557. The bell crank 557 partakes of the case-shift movement and by reacting against the arrested rod 549 at the pin-and-slot connection 558 is rocked clockwise about stud 556 to the Figure 20 position to move bar 553 leftwardly. Thereby ear 560, Figure 3, of bar 553 overrides cam 565 to rock lever 528 clockwise and thereby actuate the extra punch 493 to perforate the extra or negative balance hole 492 in the ledger sheet. The leftward shift of bar 553 brings ear 560, which has overridden cam 565, beyond said cam so that lever 528 and its punch 493 become restored by spring 526 of said punch immediately after the extra hole 492 has been punched in the ledger sheet.

The case-shifted position of the parts is sustained by means of the case shift-latch arm 404. Correspondingly, bar 553 will be sustained in its leftwardly shifted position, see also Figures 20, 21, until said total printing is completed. By the case-shift, the punching and sensing head, with the punch levers 527, is displaced upwardly and therefore the lever tongues 533 are above and out of reach of the striker plates 541 of type-bars 43. But the leftward shift of bar 553 places a group of interponent-levers 569 between the displaced punch levers 527 and the strikers 541 of type-bars 43, as in Figure 21. Bar 553 has an arm 570, presenting a transverse fulcrum stud for said interponent levers 569. Levers 569 present an array of lands 573 corresponding to the array of lever tongues 533. Said lands 573 are within the range of the type bar striker plates 541 while said tongues 533 themselves are above and out of said range because of the case-shift but are engageable by corresponding interponent levers 569.

As previously described, in the section entitled "Negative total or credit balance printing," the case-shift is attended by disconnection of the type bar 43 and the operating lever 44 of the "9–0" type-action, and by the automatic operation of said operating lever 44 without printing and, as will be apparent, without punching. Such operation of said lever 44 sets the "9" pin 76 of the highest register bar 69 for the No. 2 register; it also operates the carriage-escapement by means of cam arm 467 so that the carriage steps to the next lower place. Such operation of lever 44 also shifts means, not shown, to connect operatively the "0" blade 147 to the "0–9" type-action so that where any computing wheel, after the highest wheel of the No. 2 register, stands at "0," the "0–9" type action will be operated to print its upper case "9" and punch a representation of "0" on the ledger sheet for the denomination corresponding to said wheel.

At said next lower place, the corresponding wheel may also register "9", in respect to the negative total, in which case its total-reading finger 140 will have selected the blade 147 for the "9–0" type action, and the carriage at said next denomination will have cooperated to move said blade 147 to effect power-operation of the "9–0" lever 44, but without printing or punching. At each such non-significant figure denomination, the "9" digit pin 76 is set in the corresponding register bar by means of the "9–0" type action lever 44.

When the carriage reaches the place corresponding to the computing wheel standing for the first significant figure, of the negative balance, (any figure from "0" to "8"), the corresponding type-action will be selected and power-operated. It will be remembered that operation of any type-action from "0" to "8" causes lever 44 and type bar 43 of the "9–0" type action to become reconnected.

The operation of printing the significant figures of a negative balance proceeds automatically, digit-by-digit, and is attended by operation of the appropriate punches 491 with the result that the true negative balance is printed, by means of the upper case types 444a, and the nines complement of the true negative balance is punched through operation of the interponent levers 569 by the striker plates 541 as exemplified in Figure 21. The operation of the type actions for printing the significant figures of the true negative balance also effects settings of the pins 76, corresponding to the complement, in the register bars 69 associated with the significant figure wheels.

In the carriage step which attends the operation of the type-action to print and punch the last or units digit of the Balance, the column unit 86 for the Balance column initiates a cycle of the general operator mechanism.

If the cycle is one that attends the printing and punching of a Balance that is negative, the cam 434 and follower lever 435 serve to trip the upper-case-shift-sustaining latch arm 404 and thereby effect restoration of the machine to lower case condition. In this restoration, the platen frame 59a and its punching and sensing head H drop to lower-case position. The drop is accompanied by rightward restoration of bar 553 and counterclockwise restoration of bell crank 557 to normal positions, Figure 5, by a spring 589 attached to said bar and anchored to stud 556. The rightward restoration of bar 553 is accompanied by rightward shift of its interponent levers 569 to normal positions, Figure 5, thereby leaving the tongues 533 of punch levers 527, which have also dropped back to normal or lower case position, engageable directly by the strikers 541 of type-bars 43 again.

Before the ledger sheet is removed from the machine, a relocating hole 581 will have been punched at the right margin of the sheet, Figure 8, to serve for positioning the sheet in the machine for receiving a later new balance.

A plate 582, Figures 3, 4, 5, 6, secured to the top of cross bar 501 has a flange 583 spaced forwardly from said cross bar 501. A punch 587 is slidable in and projects forwardly from flange 583 for articulation with a punch-retracting leaf spring 589 fixed at one end to flange 583. Block 584 has a die hole for punch 587 and a stripper, not shown, is associated with the punch.

At a distance, of the line-space-unit of the ledger sheet, above punch 587, there is disposed a sheet-locating pin 590. Said pin is slidably disposed in block 584 and a rear plate 591 fixed to bar 581. Normally pin 590 projects slightly beyond the front face of the block 584.

Pivoted to plate 582 at 592 is a finger 593 urged by a spring 594 to engage and yieldably retain the ledger sheet L upon pin 590 which fits hole 581 in the ledger sheet. Said hole results from operation of punch 587 and has been advanced to said pin 590 upon replacing the ledger sheet in the machine. A gaging stop 595, Figures 5, 6, 12, supported on plate 503 is abutted by the right-hand edge of the sheet and cooperates with pin 590 to square the sheet and locate it laterally in the carriage. The ledger sheet is front inserted into a throat comprising front and rear plates 596, 597 having supporting connection to bar 581. Lower feed rolls 598, Figure 1, are cast off from the platen by usual means preparatory to the front insertion of the sheet and are restored to clamp the sheet against the platen after its location has been gaged by means of pin 590 and side stop 595.

The carriage is returned to its starting position after typing and punching the new balance. During such return, there is coincidental line space rotation of the platen which advances the ledger sheet. To permit said ledger sheet advance, the locating pin 590 is automatically retracted by means of an operative connection 600, partly shown, to the line space mechanism.

The sheet locating mechanism thus far described in this section is substantially as set forth in my copending application Serial No. 361,673, filed October 18, 1940, now Patent No. 2,304,277, dated December 8, 1942, to which reference may be had for further details.

By the letter feed carriage step attending the typing and punching of the last digit of the Balance, punch 587 has moved, along with the carriage, to reach and engage by means of a notch 601, Figure 6, of the punch, a nose 602, Figure 4, of a punch-operating lever 603 having a vertical pivot 604 on a tab 605 fixed to foundation plate 509. Said lever is articulated as at 606 to a vertical lever 607 having a pivot 608, Figure 3, on a bracket 609 fixed to foundation plate 509 by screws 614. Said carriage step has initiated a cycle and the star-printing type-bar is operated during the cycle to print a star. The structure and operation of the automatic clear sign printing mechanism is set forth in my Patent 2,405,268. The star type-bar head has a striker which strikes the front edge of a depending arm of lever 607 and thereby rocks the latter during the final portion of the printing stroke of star type bar to rock lever 603 to push punch 587 through the ledger sheet to produce the sheet-locating hole 581 which represents the position of the new balance with which the operation of star-printing is identified. At the usual restoration of the star-printing type bar following its printing stroke, spring 589 retracts punch 587 from the paper and restores it to its normal position. A spring 611, Figure 5, attached to lever 603 may cooperate to restore the punching train. By the letter-feed step attending star printing the carriage reaches and actuates a carriage-return-initiating control 612, Figure 1, to automatically cause return of the carriage to its starting position, gaged by a margin stop 613. The carriage return features may be substantially as exemplified in H. L. Pitman Patent No. 1,624,068, dated April 12, 1927. With the return of the carriage, the feed rolls 598 may be cast off to release the ledger sheet and the latter may be withdrawn from the machine.

During the initial portion of the carriage-return movement, the carriage alone returns while the punching and sensing head H remains stationary against stop 548 under the influence of the punching-and-sensing-head spring 516. However, as soon as stop 520 of the returning carriage encounters stop 519 of the stationary punching-and-sensing head, the latter is returned along with the carriage for the remainder of the carriage-return movement which brings both the carriage and the punching-and-sensing head to the fully returned Figure 3 position.

Consider, now, a later time when a later new balance is to be computed and recorded, on the ledger sheet. The sheet is, therefore, front inserted in the machine again and placed with its last-made hole 581 over sheet locating pin 590 and with its edge against stop 595 thereby positioning the sheet laterally in the machine and with the last-made line of perforations 493, and including possibly 492, advanced above the punching line so that said perforations may traverse the group of sensing pins 494, 495. With the sheet thus located in the carriage, the feed rolls 598 are restored, said rolls having been cast off preparatory to front inserting the sheet.

*Sensing pin and contact mechanism*

A vertical plate 618 and a vertical plate 619, Figures 4, 5, 6, 11, 18, 22, spaced rearwardly therefrom include, respectively, horizontal upper plates 620 and 621 which overlap and are fixed together by screws 622. Plate 621 and its hub 623, Figures 5, 11, are fixed to vertical shaft 529 by set-screws 624. Horizontal plate 621 is above the upper one of the bracket ears 530 in which said shaft 529 is journaled. Shaft 529 and its attached plates 618, 619 form a unit which is urged counterclockwise by a spring 625 anchored at 626, Figure 4, to foundation plate 509. A stop 627 of plate 621 abuts a stop 628 on upper bracket ear 530 to limit the counterclockwise turning of said unit by spring 625.

Each of the sensing pins 494, 495 is supported and guided, see also Figure 19, for endwise movement in aligned holes provided in plate 619 and foundation plate 509.

The sensing pins have each a shoulder 629 engaging plate 619 to block rearward or ledger-sheet-sensing movement of pins 494, 495 while said plate 619 is normally positioned forwardly as determined by spring 625 and stops 627, 628. Each sensing pin includes a forward end 630 of insulator material for engaging a companion contact finger 631. A transverse plate 632 having a fulcrum ridge 633, Figure 19, on which fingers 631 bear, and a plate 634 in front of fingers 631 are fixed to plate 618 by screws 635 but are electrically insulated from plate 618 and spaced apart by insulator bushings 636 and spacers 637. Each finger has a hole to fit movably over a companion stud 638 fixed in plate 632. Each finger 631 also has a stud 639 loosely fitting a companion slot 640 in plate 632. Each stud 638 carries a spring 641 which, reacting against plate 634, urges the companion finger 631 clockwise about fulcrum ridge 633. Studs 638, 639 and slots 640 cooperate to space the fingers laterally in accordance with the spacing of the sensing pins 494, 495 in a direction paralleling the fulcrum ridge 633 which is slanted, Figure 11, in respect to the inclination of the array of said sensing pins.

The upper end of each finger has a contact 642, Figure 19, opposite a corresponding front contact edge of one of a series of horizontal contact bars 643. Said contact bars 643, a common contact bar 644, a bottom clamping bar 645, and spacing bars 646 of insulator material form a vertical stack, Figure 7. Screws 647 passing through insulator sleeves 648 in the stack and threaded into the bottom clamping bar 645, fix the stack and upper spacers 649 to a supporting plate 650 fixed by screws 651 upon plate 582. The common contact bar 644 is engageable by an extra finger 652, Figures 5, 16, with which are associated studs 638, 639 and spring 641, like the other fingers 631.

When plate 619 is in its forward position, as determined by stops 627, 628 and spring 625, the spring-pressed fingers 631 may bear against their sensing pins 494, 495, or against collars 653, but do not reach and contact their respective contact bars 643, and the sensing pins are stopped, at their shoulders 629 by said plate 619, from reaching the ledger sheet L, Figure 19. There is no sensing pin for the common finger 652 but the latter may be merely stopped by collar 653 on its stud 638 to keep it from contacting the common contact bar 644, when said plate 619 is in said forward position.

The several contact bars 643, 644 are electrically connected by wires 666 to corresponding contact bars 659 on the column unit 86, Figures 13, 14 and 16, and are arranged to engage corresponding ones of a set of lugs 672 of contact strips 671 on a relay box 667 attached to the tabulator housing 181.

Relay mechanism

Individual to each sensing pin 494, 495 there is a relay unit R, Figure 13, mounted in box 667. Each relay unit includes an electromagnet, an armature 673 and a one, two, three or four-pole normally open contact device D. In the Figure 16 circuit diagram, c' is the relay magnet corresponding to the credit-balance sensing pin 495, and 1', 2', 3', 4' and 5' are the relay magnets corresponding respectively to the five sensing pins 494. In Figure 17 the reference numerals c', 1'-5', for the relay magnets, are joined by lead lines to corresponding sensing pin locations to identify each sensing pin and its corresponding relay magnet. Magnets c' and 1' each control a one-pole contact device; magnets 2' and 3' control, respectively, a two-pole contact device and a three-pole contact device; magnets 4' and 5' each control a four-pole contact device.

Each relay magnet coil is connected by a lead 680 Figure 16, to a corresponding contact strip 671, 672. The other magnet terminals have a common connection 681 to a lead 682 from one side of a current source S. The other side of the current source S is connected by a lead 683 to the lowermost contact strip 671, 672.

When any one of the sensing pins 494, 495 enters a corresponding perforation in the ledger sheet 489, the corresponding finger 631 will engage its contact bar 643. At this time, the common finger 652 will also be in engagement with the common contact bar 644. Therefore, the relay magnet corresponding to the hole-entering pin will be energized.

The various circuits involved in this and other later described phases of operation of the sensing means are set forth in detail in my copending Patent 2,405,268.

Means for arresting the punching and sensing head and permitting the functioning of the sensing mechanism.

A vertical plate 689, Figures 6, 12, 18, 22, is laterally adjustable at its attachment at 690 to a support 691 fixed to typewriter frame F. A stop 692 pivoted at 693 to plate 689 is normally positioned by its latch shoulder 694 stopping against a corner 695 of an arm 696 pivoted at 697 to plate 689. A spring 698 anchored to plate 689 supports arm 696. A stud-and-slot connection 699 retains said arm facewise and limits its pivotal movements. A spring 700 anchored to plate 689 is attached to stop 692 to pull normally on a line through the center of stop pivot 693 when said stop is in normal position. A cam tongue 701 and connecting yoke 702 are integral with arm 696. To the shaft 529 to which are fixed plates 618, 619 which support the sensing pins 494, 495 and contact fingers 631, 652 there is also fixed an arm 703 having a cam-edge 704 and a stop-edge 705.

When the carriage is advanced, as by operation of the tabulating key, from the fully returned position, Figure 12, to the highest order position for the Old balance column, the punching and sensing head H also advances since it is coupled to the carriage by means of spring 516 and stops 519, 520. As the carriage and its punching and sensing head H settle at said highest order position, the cam edge 704 of arm 703 will have encountered stop 692 and will thereby have caused said arm 703 and hence the plates 618, 619 which support the sensing pins and contact fingers 631, 652 to turn clockwise, Figure 5, with shaft 529. This turning of plate 619 is to retract it rearwardly from shoulders 629 of the sensing pins 494, 495 so that each sensing pin becomes free to enter and thereby sense a perforation 490, 492, if one be present, under the urge of spring 641 of the corresponding contact finger 631. Plate 523 may stop a screw-stop 707, Figure 4, in plate 619 to limit said turning of the latter. Said contact finger 631 moves into contact with its contact bar 643 if its sensing pin enters a ledger sheet perforation. Conversely, if no perforation is present opposite any sensing pin, the latter merely bears against the face of the ledger sheet, when said plate 619 is retracted rearwardly, and the corresponding contact finger is, of course, prevented from contacting its contact bar 643. The rearward retraction of plate 619 also retracts collar 653 from the common finger 652 thereby causing the latter in any case to immediately contact the common contact bar 644 under the urge of the spring 641.

When the carriage and the punching-and-sensing head are at the highest order position for the Old balance column, the stop edge 705 of arm 703 will have just reached stop 692 thereby determining that the punching-and-sensing head H, and its sensing pins 494, 495, will be arrested and held stationary laterally by said stop 692 during advance of the carriage through the Old balance column zone. Stop 692 is long enough vertically to be capable of engaging lever 703 in either lower case or upper case position of said lever which partakes of the case shifts of platen frame 59a. When head H is thus arrested, the line of perforations 490 of the ledger sheet may traverse the stationary group of sensing pins 494, 495 to enable the latter to sense the ledger sheet step-by-step at the Old balance column as will be described presently.

When the last or units denomination of the Old balance column has been sensed, further advance movement of the carriage immediately will cause a bar 706 attached to plate 503, to engage and depress the cam-tongue 701 to depress arm 696 to withdraw its latching corner 695 from stop 692. The prior advance of the carriage to the last denomination of the Old balance zone, has stretched spring 516 and caused carriage stop 520 to recede from its companion punching-and-sensing-head stop 519. Upon release of the arresting stop 692 by the described depression of arm 696 the punching-and-sensing head, urged by spring 516, jumps ahead and is arrested relatively to the carriage by means of said stops 519, 520. In this jump, stop edge 705 and its arm 703 merely override stop 692 and turn it counterclockwise, from the Figure 12 position, incidentally overcoming the comparatively weak stop spring 700. When arm 703 has left stop 692, due to further advance of the carriage and punching-and-sensing head in unison, said stop may become restored by its spring 700 and be ready to be reengaged by arm 696 when the latter becomes restored by its spring 698 consequently to advance of bar 706 beyond cam tongue 701. The release of the arresting stop 692, effected by depression of arm 696, also releases arm 703 and hence releases plates 618, 619 for counterclockwise movement, Figure 4, by spring 625, said movement being limited by stops 627, 628. This retracts the sensing pins 494, 495 from the ledger sheet and restores the condition of preventing the contact fingers 631, 652 from contacting their contact bars 643, 644. It will be understood that at the movement of the carriage, through the Old balance zone relatively to the punching and sensing head, the contact bars 643, 644 move, with the carriage, relatively to the contact fingers 631, 652 and that each bar is of sufficient length to be engageable by its finger at any point in said carriage movement for the Old balance column. At the later return of the carriage, following the sensing operation, arm 703 passes over and idly rotates stop 692 clockwise of Figure 12, the stop spring 700 finally restoring said stop to normal position by the time the carriage return is completed.

*Mechanism for reentering the sensed amount in the machine*

Ten electromagnets M, Figures 1, 16, 18, 22, one for each of the numeral type actions and a credit-balance electromagnet CM, are supported in a transverse row by means of an angle-bar 709, fixed to the typewriter frame, insulator bars 710, 711, and magnet holding screws 712. Armatures 713, one for each of said magnets M have fulcrum notches fitting a fulcrum edge 714 of angle-bar 709, Figure 1. A strip 715 cooperates with edge 714 to fulcrum the armatures 713 and is fixed by clips and screws 716 to angle-bar 709. Levers 717, each associated with a corresponding numeral magnet M are fulcrumed as at 718 to turn individually on a transverse rock shaft 719, journaled in brackets 720 for turning independently of said levers 717, and having fixed thereto an operating lever 721. A transverse bar 722 fixed to the typewriter frame includes said brackets 720 and has sockets for compression springs 723 urging the levers 717, 721, counterclockwise individually. A finger 724 fixed to each armature 713 engages the corresponding one of the levers 717, 721. As urged by lever spring 723 each finger 724 normally bears against the under side of bar 722 to place the corresponding armature 713 in normally retracted position from its magnet core. Each lever 717, associated with a numeral magnet M, is operatively connected at 725 to the draw link 54 of the corresponding numeral type action.

The lever 721 is operable by the credit-balance magnet CM and is operatively connected to a draw link 54ᵃ Figure 22, pivoted to a bell crank 50ᵇ fulcrumed on rod 51 and connected by a link 48ᵃ to an operating lever 44ᵃ. A bell crank 45ᵃ connects lever 44ᵃ to a bar 726 that is similar to type bars 43 but has a typeless head 727; the train from draw link 54ᵃ to bar 726 serves as a dummy type action of sufficient driving weight for simultaneously setting all the "9" pins in the register bars 69 of the No. 2 register. An extra linkage 728 for setting the "9" pins 76 is provided. Like the other pin setting linkages 78, linkage 728 comprises cross link 729 connected at its ends to a pin-setting bar 730 by bellcranks 731 of which only one is shown, a rod 81ᵃ pendent from operating lever 44ᵃ may engage a crank arm 80ᵃ of a rock shaft 79ᵃ connected at 732 to cross link 729. Said pin-setting bar 730 includes a lip 733 for engaging all the "9" pins of the several register bars of the No. 2 register, all of said register bars being in their normal fully retracted positions when all the "9" pins are to be set.

An arm 734 is fixed to rock shaft 719 and is operatively connected to an intermediate lever 735 fulcrumed on the framework at 736. Said intermediate lever 735 has a tab 737 for engaging stud 442 of lever 439 which is thus operative to move the case shift draw link 393 into engagement with the power-driven snatch roll 57.

*Sensing and entering a negative or credit balance in the machine*

When the carriage is at the highest wheel position for the Old balance column, the credit-balance sensing pin 495 may sense and enter the extra or credit balance hole 492, such hole being present in the line of perforations representing the credit-balance. This sensing of the extra hole energizes the credit-balance relay-magnet c'. The stack of contact bars 659 on the carriage will have become engaged with the lugs 672 of contact strips 671 by the carriage having become positioned at the highest wheel position for the Old balance column.

The energized credit balance relay magnet c' attracts its armature 673 to close the corresponding one-pole contact device D. This energizes the credit balance magnet CM through the following circuit, Figure 16: current source S, lead 682 including normally closed switch 684, said closed one-pole contact device D, lead 738 to magnet CM, common bus bar 739 and return lead 740 to the current source S.

The energized magnet CM attracts its armature 713 to rock shaft 719 to connect the case shift draw link 393, and the draw link 54ᵃ, for the "9" pin setting train, to snatch roll 57. The resulting case-shift operation lifts bar 445, Figure 20, into detented position to disconnect the "9-0" type lever 43 from its lever 44, and to connect the corresponding draw link 54 to snatch roll 57 for a carriage-spacing operation of said "9-0" lever to bring the carriage and ledges sheet from the highest wheel position to the next position for the Old balance column in the same manner as described in the section "Negative total or credit balance printing." The draw link 54ᵃ having also been connected to the snatch roll by the energization of the credit balance magnet CM, the lever 44ᵃ will be operated and the attending operation of the extra linkage 728 will set collectively all the "9" pins in the several register bars of the No. 2 register, whereupon said draw link 54ᵃ becomes disengaged from the snatch roll by encountering knock-off 348.

Although said draw link 54ᵃ has thus been disengaged from snatch roll 57, spring return of the "9" pin setting train, extending from said draw link 54ᵃ to pin-setting bar 730, is delayed until deenergization of the magnet CM has occurred. This delay prevents a repeat operation of said train and is provided for by having a shoulder 743, Figure 22, of the forwardly-tending disengaged draw link 54ᵃ opposed by a hook 744 of lever 721 as long as the latter remains operated by magnet CM. When magnet CM is deenergized, hook 744 drops, under the influence of companion spring 723, to release draw link 54ᵃ so that the latter and the "9" pin setting train become spring-returned to normal positions. In the normal positions of the parts, hook 744 is under a land 745 of draw link 54ᵃ so that operation of said lever may raise said draw link into engagement with the snatch roll 57.

Switch 684 is operatively connected to the escapement mechanism, as described in my Patent 2,405,268, so that said switch opens to disconnect lead 682 from current source S to deenergize the credit balance relay magnet c' and its companion magnet CM before the carriage and ledger sheet move in the letter-feed step induced by operation of the escapement.

By a letter-feed step of the carriage, and of the ledger sheet L, any sensed hole 490, 492 leaves the therein entered sensing pin. Each sensing pin has a conical end 753, Figure 19, of base diameter larger than the ledger sheet hole and which end seats against the edge of the hole it enters. The entered pin does not obstruct the letter feed movement of the ledger sheet since its conical end is merely cammed outwardly by the edge of the hole at said ledger sheet movement. The outward movement of the sensing pin separates the companion finger 631 from its contact bar 643. The circuit having been opened by the prior opening of switch 684 there will be no sparking at the point of separation of the finger and its contact bar. The ledger-sheet-backing foundation plate 509 has, for each sensing pin 494, 495, a spot or hole 754 for clearing the conical end of the sensing pin to permit said end to seat against the edge of the hole.

By the letter-feed step of the carriage and ledger sheet, which follows the sensing of the credit balance hole 492, the highest-figure place of the perforation column of the sheet is brought opposite the group of five sensing pins 494. If the perforations representing the first significant figure of the balance do not appear at such place, none of said five sensing pins 494 can enter the ledger sheet. In that case they merely bear idly upon the sheet so that further automatic operation of the machine will wait on the typist advancing the carriage by means of the usual space key or the appropriate tabulating key 184 to bring the first-significant-figure-perforation place of the ledger sheet opposite the group of sensing pins 494, the typist noting the amount standing typed in the Balance column. If the amount is of such magnitude that the perforated first significant figure appears at said highest place in the perforation column, no advance of the carriage by the typist is necessary. In either case, the two perforations 490 representing the first significant figure are entered into by the corresponding two of the sensing pins 494 when the carriage becomes positioned at the place corresponding to the first significant figure.

The two perforations representing the first significant figure of a negative balance may be for any digit from "0" to "8," it being remembered that the nines complement of the true negative balance is represented, and that "0" is the complement of "9" which may be a first significant figure of the true negative balance. When any such two perforations are sensed, the corresponding two of the relay magnets 1'—5' will be energized to close the corresponding two contact devices D. As will be understood from the circuit diagram at Figure 16, and the schedule, Figure 15, the closure of these two contact devices D makes a circuit to select and energize the magnet M for the numeral type action whose lower-case value corresponds to the two holes being sensed.

In Figure 19, for example, the sensing of two perforations representing the digit "5" is illustrated. The platen is represented as being in lower-case position for printing "5" as would be the condition in sensing a positive amount. However, if the amount is negative, as is being presently considered, the platen would be in upper-case position for printing the upper case "4" whose complement "5" is being sensed. The entry of the corresponding sensing pins in said two perforations closes two circuits to select and energize the corresponding two relay magnets 1' and 4' so that these close their corresponding contact devices D to select and energize the magnet M for the "5-4" type action.

The energized magnet M attracts its armature 713 to operate its lever 717 to lift draw link 54 for the "5-4" type action into engagement with snatch roll 57. The resulting actuation of said "5-4" type-action prints the upper case "4" on the ledge sheet but sets the "5" index pin 76 in the register bar 69 corresponding to the computing wheel of the No. 2 register in which the sensed first significant figure is to be entered. Said register bar 69 is selected for indexing because the carriage is at the position corresponding to the first significant figure place and operates through the column unit 86 to depress the corresponding jack 82 at said place to advance said register bar to indexing position. Just before the type bar 43 reaches the platen to print, draw link 54 encounters the knock-off 348 and thereby becomes disconnected from the snatch roll for spring-return of the type action after the completion of the printing stroke.

At its movement to set position in said register bar, the "5" index pin 76 momentarily deflects the universal pin latching bar 47, Figure 1, to release the previously set "9" pin for immediate restoration by its spring 46.

At actuation of the "5-4" type action, the carriage is letter spaced to the next place; consonantly with this letter spacing movement, switch 684 is opened and reclosed, in the manner hereinbefore described, to deenergize relay magnets 1', 4' and the "5-4" magnet M and to prevent sparking between the contact fingers 631 and contact bars 643.

At said next place of the carriage, another two perforations may be presented to the sensing pins 494 and therefore similar operations, as just described with reference to the "5-4" type-action, may proceed. It will be understood, therefore, without repeating the description for each digit of a negative amount, that the operations proceed automatically digit-by-digit, beginning with the first and ending with the last digit of a negative amount as represented by the line of perforations 490.

The operation of any type-action, in response to sensing the perforations for the first significant figure of a negative balance, depresses and thereby restores the bar 445 to reconnect the type bar 43 and bell crank 45 of the "9-0" type action to the companion operating lever 44. This is consonant with the condition that any one of all the numeral type actions is subject to use for typing in upper case and indexing a lower-case value pin 76 after the first significant figure has been typed and indexed.

In the letter-feed step of the carriage which attends the sensing, typing and indexing of the last digit of the negative amount, the Old balance column unit 86 initiates a cycle in which the general operator cross bar 137 operates the register bars 63 for the No. 2 register to enter additively in the latter the amount represented by the set pins 76 in said register bars. The cycle also operates by means of the cam 434 and follower lever 435 to trip the case-shift-sustaining latch arm 404 so that the platen frame, ledger sheet, and sensing head drop back to lower-case position.

It may be noted here that the sensing pin mechanism may function irrespective of whether the machine is in lower or upper case condition and that the upper case condition obtains, when sensing a negative balance, to enable the type bars to print the true negative balance in the Old balance column by means of the upper case types 444a.

The perforation field of the ledger sheet, in the present instance, runs up to eight places to represent negative amounts and positive amounts up to 999999 99

As previously stated, only the significant figures of an amount are punched on the ledger sheet. But in the case of a negative amount, if the number of digits punched is less than eight, the machine operates, nevertheless, to enter the insignificant "9's" in the corresponding register bars because "9" pins are set in all the nine register bars for the No. 2 register as determined by the credit balance hole 492 and are caused to be restored in those significant figure register bars in which any pin from "0" to "8" becomes set. If, for example, the line of perforations for a negative balance on the ledger sheet represents 5903 62 which is the nines complement of the true negative balance 4096 37 the No. 2 register, comprising nine wheels, will become operated additively from its clear condition, under control of the credit balance hole 492 and the perforations representing 5903 62, to stand at 9995903 62 to accord with the standing of the register which obtained when the negative balance previously was read out and typed and punched in the Balance column.

*Sensing and entering a positive balance*

A ledger sheet having been inserted in the machine, the carriage may be advanced from its fully returned position to the place, for the Old balance column, corresponding to the highest of the nine wheels of the No. 2 register. If the line of perforations about to be sensed represents a positive balance, it will not include a credit balance hole 492 and, therefore, the hereinbefore described functions determined by such hole will not occur upon advancing the carriage to said place for the highest order wheel. The typist, observing the magnitude of the typed positive amount in the Balance column, then operates the space key or the appropriate tabulating key to advance the carriage, with the ledger sheet, to the place corresponding to the first significant figure of the positive balance. Alternatively, since the distinctive characters, as made by the lower case types 444, indicates that an amount is positive, the typist may observe this and accordingly advance the carriage directly from its fully returned position to the first significant figure place by operation of the appropriate tabulating key or the space key.

The sensing and attendant selection and energization of a type-action magnet M to effect actuation of a corresponding type-action proceeds digit-by-digit to index the positive balance in the appropriate register bars for the No. 2 register. Since the balance is positive, the type actions operate in lower case and there is no preparatory setting of the "9" pins in all the register bars of said register. In the letter-feed step which attends the sensing and indexing of the last digit of the positive balance, the old Balance column unit 86 initiates a cycle in which the indexed register bars are actuated to enter the positive balance additively in the clear No. 2 register. If, for example, the line of perforations represents a positive balance of 5806 36 the nine wheels of the No. 2 register will stand at the end of said cycle at 0005806 36 to accord with the standing of the register which obtained when the positive balance was previously read out therefrom and typed and punched in the Balance column.

*Debit and credit entries*

Following the entries of the Old balance in the clear No. 2 register and which Old balance may be either positive or negative as has been shown, the carriage advances for typing in the Date, Description, and Order No. columns. Following this, an entry is typed in the debit or credit column with attendant advance of the carriage and concomitantly such debit or credit entry is indexed in the register bars of the No. 2 register. The carriage carries a column unit 86 for the debit column and another column unit 86 for the credit column. The credit column unit may have a subtraction tappet 111a for depressing cam plate 111 for automatically determining subtractive rotation of the wheels to subtract the credit from the Old balance when the machine is cycled.

*Reading out and punching the balance*

Following the cycling of the machine for the debit or credit, the total key 178 is operated, for advancing the carriage to the place in the Balance column corresponding to the highest order wheel of the nine wheels of the No. 2 register. It results that the new balance is automatically read out, indexed in the register bars and punched on the ledger sheet, and may be either positive or negative. The machine is finally cycled to clear the indexed new balance from the No. 2 register and to print the star after the new balance typed on the ledger sheet, all as hereinbefore described.

*Punctuation spacing in punching and sensing*

At the Balance zone, the carriage reaches a punctuation place by the letter-feed step which attends the reading of the computing pinion and punching operation for units-of-dollars and at such punctuation place, the column unit 86 will have depressed the punctuation jack 281. The resulting further letter-feed step of the carriage brings the latter to the tens-of-cents place where the corresponding computing pinion is read and typing and punching of a digit are effected. Therefore, the place on the ledger sheet, where the tens-of-centes digit is punched, is separated from the place, where a units-of-dollars digit may be punched, by a blank punctuation space at which no punching is effected.

In sensing the punched amount while the carriage traverses the Old balance zone, the letter-feed step which follows the sensing of the punched units-of-dollars digit brings the carriage to the place where the blank punctuation space in the line of perforations 490 registers with the group of sensing pins 494. However, by reaching such place, the carriage will have depressed, through the Old balance column unit 86, the punctuation jack 281, and it results immediately that the carriage is further letter spaced automatically to bring the perforations for the tens-of-cents digit opposite the group of sensing pins.

A latching device 757, 764, Figure 3, may be provided for holding the punching and sensing head H in a locked-out position, Figure 2. This enables posting an amount in the Balance column without punching, and enables making an entry in the Old balance column independently of a line of perforations. The details and operation of the latching device are described in my Patent 2,405,268.

The operation of the machine embodying the invention will be understood in detail from the foregoing description. Negative balances as well as positive balances are dealt with in automatically recording on and subsequently automatically reading or picking up the positive or negative balances from the ledger sheet for reentry in the machine preparatory to deriving a further new balance. A printing of the true negative balance is effected upon the ledger sheet. In respect to picking up an old negative balance or an old positive balance from the ledger sheet, for reentry into the cleared register, such reentry restores the register to the same balance-registering condition as obtained before the register was cleared at the previous recording of the balance as a new balance on the ledger sheet. The sensable codal representations or perforations of the balance are entered in an individual column of the ledger sheet. The recording of a new balance on the ledger sheet in the form of codal representations and the subsequent picking up and reentering of such new balance are accomplished digit-by-digit, that is, by means of typewriter mechanism including types printing at a common printing point and a cooperative carriage.

Variations may be resorted to within the scope of the invention and portions of the improvements may be used without others.

What is claimed is:

1. Sensing means for a perforate codal record of a series of characters, in which record at least two perforations codally represent each character and the perforations representing two or more characters may be interspersed, the perforations being spaced in a feed direction and lying in different planes parallel to the feed direction, said sensing means comprising, a complement of sensing pins of lesser number than the total number of characters that may be codally recorded, and means for effecting a relative feeding movement of the sensing-pin complement and the perforate record in small uniform increments, to sense one character representation incident to each increment of feed, the sensing pins lying in different planes parallel to the direction of feed, and being spaced in the feed direction to an extent greater than the feed increment.

2. A device for the step-by-step sensing of combinational two hole perforations in a record field wherein the perforations codally representing two or more characters are relatively interspersed, said device comprising, a group of sensing pins spaced in a feed direction and lying in different planes parallel to said direction, and means for effecting a relative step-feed of the group and the record; the spacing of the sensing pins in the feed direction extending them to simultaneously sense two perforations further spaced than the distance of step-feed and the arrangement of certain of the pins in the different planes enabling the passing of certain of the pins beyond certain of the perforations in one step of feed for effective sensing on the next step of feed.

3. Means for sensing a record bearing codal spot indicia representing a series of characters, the spot indicia of each character being spaced in a feed direction and lying in different planes parallel to the direction of feed, said sensing means comprising, a group of record-reading elements adapted to be influenced by the codal representations, said elements being of lesser number than the total number of characters that may be codally recorded, means for effecting a relative feeding movement of the record and the sensing-element group in small uniform increments, to sense the indicia of one character incident to each increment of feed, the sensing elements lying in different planes parallel to the direction of feed and being arranged in sub-groups spaced in the direction of feed to an extent greater than the increment of feed.

4. Sensing means for a perforate codal record of a series of characters, in which record at least two perforations codally represent each character, the perforations for each character being spaced in a feed direction and lying in different planes parallel to the direction of feed, said sensing means comprising, a group of sensing elements of lesser number than the total number of characters that may be codally recorded, said sensing elements being arranged in two or more sub-groups, and means for effecting a relative feeding movement of the sensing-element group and the perforation record in small uniform increments, to sense one character representation incident to each increment of feed, the sensing elements lying in different planes parallel to the direction of feed and being arranged in sub-groups spaced in the direction of feed to an extent greater than the increment of feed, the elements of one sub-group being staggered vertically relatively to the other sub-group.

5. A device for the step-by-step sensing of combinational two hole perforations in a record field wherein the perforations codally representing two or more characters may be interspersed and in staggered array, said device comprising, a group of sensing pins arranged in two sub-groups spaced in the feed direction a distance greater than the extent of a step of feed, and means for effecting a relative step-feed of the group and the record field, the pins in each sub-group being arranged in parallel lines transverse to the direction of feed and the pins of the two sub-groups being in staggered relation.

RICHARD W. PITMAN.

REFERENCES CITED

The following references are of record in the file of this patent:

UNITED STATES PATENTS

| Number | Name | Date |
| --- | --- | --- |
| 1,950,504 | Martin | Mar. 13, 1934 |
| 1,976,617 | Lake et al. | Oct. 9, 1934 |
| 2,083,061 | Gollwitzer | June 8, 1937 |
| 2,273,740 | Terry | Feb. 17, 1942 |
| 2,278,118 | Pitman | Mar. 31, 1942 |
| 1,950,187 | Mansel | Mar. 6, 1934 |
| 2,323,833 | Mixer | July 6, 1943 |
| 2,345,289 | Rieber | Mar. 28, 1944 |

FOREIGN PATENTS

| Number | Country | Date |
| --- | --- | --- |
| 472,776 | Great Britain | Sept. 30, 1937 |